March 25, 1969     D. D. ROSHON, JR., ET AL     3,435,186
SELECTIVE PIERCING AND MACHINING OF SHEET MATERIAL
Original Filed Feb. 20, 1964

INVENTORS
DAVID D. ROSHON, JR.
THOMAS YOUNG

BY
AGENT

United States Patent Office 3,435,186
Patented Mar. 25, 1969

3,435,186
SELECTIVE PIERCING AND MACHINING OF SHEET MATERIAL
David D. Roshon, Jr., Binghamton, and Thomas Young, Apalachin, N.Y., assignors to International Business Machines Corporation, New York, N.Y., a corporation of New York
Original application Feb. 20, 1964, Ser. No. 346,215, now Patent No. 3,293,652, dated Dec. 20, 1966. Divided and this application May 16, 1966, Ser. No. 550,554
Int. Cl. B23k *15/00, 9/16, 9/00*
U.S. Cl. 219—121                                             5 Claims

ABSTRACT OF THE DISCLOSURE

Selective machining of thin materials such as ceramic substrates, sheets of paper, card stock, and the like, are effected by adding a coating to selected surface areas on the back surface of the thin material and applying a laser beam to the front surface of the material, the coating having a higher energy absorbing characteristic than that of the material. The beam energy of the laser is at a level which is insufficient to machine the material; however, when the coating is encountered by the beam on the back surface, enough energy will be accumulated to cause machining and removal of substrate along with the coating, the remaining portions of the substrate being unaffected by the beam.

---

This application is a division of application Ser. No. 346,215, filed Feb. 20, 1964, now Patent No. 3,293,652, issued Dec. 20, 1966, by David D. Roshon, Jr., and Thomas Young.

The invention relates to piercing and machining of materials by means of a high energy electromagnetic beam and, more specifically, to the selective piercing and machining of materials by means of a high energy beam; for example, a laser beam.

In general, it is well known that energy beams have been employed for piercing and machining of materials. These operations, however, have been performed by high powered continuous energy beams which necessitate the use of either a mechanical shutter or electrical control apparatus to effect selective machining or piercing.

Accordingly, it is an object of the present invention to enable selective piercing and machining operations to be performed on substrates and the like by means of a laser beam of relatively low power which obviates the need of special mechanical shutters or control apparatus.

A specific object resides in the unique manner in which a black body is employed in combination with the substrate material to bring about selective machining or piercing thereof by a laser beam of relatively low power.

A more specific object resides in the unique manner in which a black body configuration is employed in combination with a substrate having thereon a thin film circuit to enable selective machining of the latter by means of a laser beam of relatively high energy.

Another specific object resides in the application of information, representing patterns of coatings, to selected areas of a document or other sheet material whereby selective piercing or machining of these selected areas may be achieved at high speeds by means of a laser beam under control of said patterns.

The foregoing and other objects, features and advantages of the invention will be apparent from the following more particular description of preferred embodiments of the invention as illustrated in the accompanying drawings.

In general, it is well known that, when a laser beam of sufficient power and intensity is directed upon a sheet of paper, metal or nonconducting substrate, material is removed by burning or evaporation. The rate at which this action occurs depends mainly upon the energy absorption rate of the material and the amount of energy in the incident laser beam. Present methods for removing materials employ a brute force laser beam of such power and intensity that, when directed upon the material, immediate removal of the material is carried out. To provide selectivity in the operation, it is necessary to introduce mechanical shutters or other electrical control apparatus to turn the beam off.

In one form of the present invention, the energy of a selected ruby laser beam is of relatively low energy, for example 1 to 1.5 joules, and at an energy threshold value at or below which no visible damage results to the surface which is influenced by the beam, but above which valve material would be removed. However, the presence of a black body, for example of 3 to 5 mils diameter, upon the remote surface of the material which is directly opposite the surface area (also termed the near surface) upon which the laser beam, of approximately 3 to 5 mils diameter, is incident, will cause burning or evaporation of the material in the discrete area impinged by the incident beam to thus form a hole.

Figure 1:
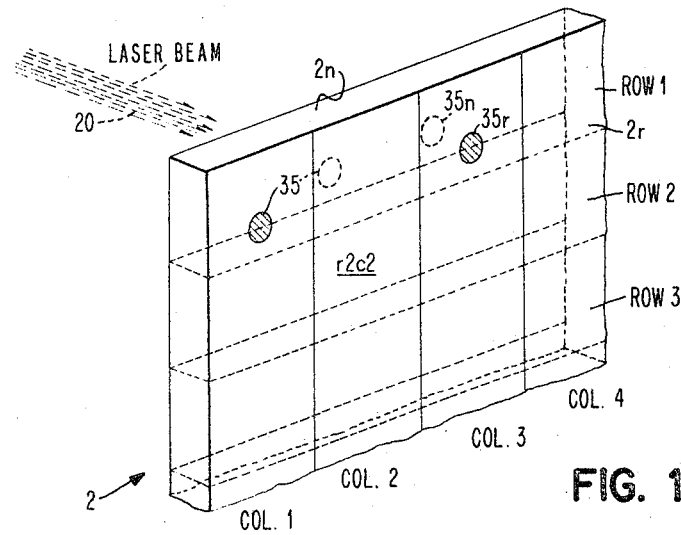
FIG. 1 shows columnar portions of a document with different coded spot configurations.

The selective piercing of conventional punch card documents has been successfully demonstrated by directing a coherent laser beam having an energy level of below three joules against the front surface of the card, a portion of which is shown in FIG. 1, and effecting piercing only through those regions which were coated on the reverse side with black body material, for example ink spots having a relatively high factor of absorption.

In the embodiment of FIG. 1 the front and rear surfaces of the card are respectively designated $2n$ and $2r$. Each surface is divided into rows and columns which form discrete areas at the intersections. The columns and rows respectively of one surface are coincident with corresponding columns and rows on the other surface so that a discrete area on one side formed by a given row and column will be coincident with a discrete area on the other side of the document formed by a corresponding row and column. These discrete areas can thus be identified as belonging to a given row and column, for example $r_2$–$c_2$. Each such area is adapted to be covered by a black body having a high factor of energy absorption. The black body may be applied in any desired configuration, for example, a dot, circle, square, rectangle, etc., and these may be applied in any desired arrangement or code pattern. A particular code pattern employed in connection with the present invention employs four different combinations whereby selective piercing of the document substrate may be achieved. The four different combinations are as follows:

(1) The presence of a spot on a front discrete area and the absence of a spot on the corresponding discrete area on the back.

(2) The reverse combination of (1).

(3) The absence of spots in corresponding discrete areas.

(4) The presence of a spot on corresponding discrete areas.

In accordance with these different combinations of spots, selective piercing operations are controlled as follows: The presence of a spot 35 in column 1 on the remote surface 2r causes the impinging laser beam 20 to pierce a hole through the document 2. Where a back-to-back combination of spots 35n–35r, as in column 3, is presented to the laser beam 20, no piercing results since the energy of the laser beam is absorbed by the spot 35n on the near surface 2n impinged by the beam, which combination is often used for error correction so as to prevent the machining operation. Where the beam 20 impinges an area on which no spot is present either on the near or the remote side, as in column 4, no piercing takes place. Nor will piercing take place where a spot 35 appears, as in column 2, on only the near surface 2n directly impinged by the beam.

Figure 2:
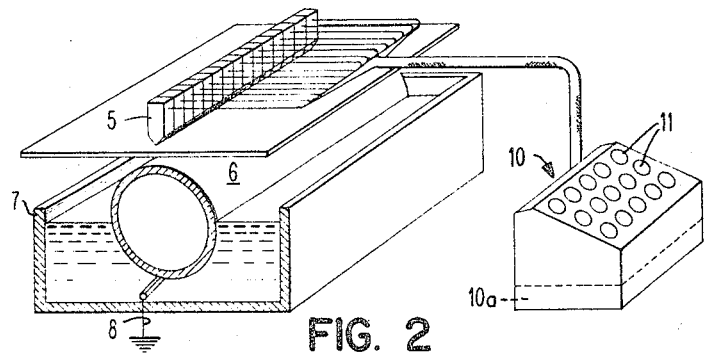
FIG. 2 shows an apparatus for applying black body material upon the surface of a document substrate.

Apparatus for applying the black body spots is shown in FIG. 2 and comprises a row of electrodes 5 supported by suitable means, not shown, above the path of the document. Below the document and in proximity thereto is disposed a rotating drum 6 immersed in a tank 7 containing a black body fluid, for example ink. The drum 6 is electrically grounded by way of a connecting line 8. A control keyboard 10 having keys 11 is employed for selectively energizing the electrodes 5 with high voltage, approximately 3,000 volts. An electrode, so selected and influenced by the high voltage, causes the black body material to be transferred from the drum surface to the document undersurface in a discrete area opposite the selected electrode. The printing operation is performed while the document is in motion. Alternatively, other designs may be employed wherein the document may be intermittently advanced so that printing may be effected while the document is at rest.

The detailed document portion shown in FIG. 1 may be constituted of substrate material, for example, paper, metal, ceramic, or other materials, which can be volatized, burned or destroyed by means of a high energy beam, a laser beam for example, and it can be either in sheet or web form.

Figure 3:
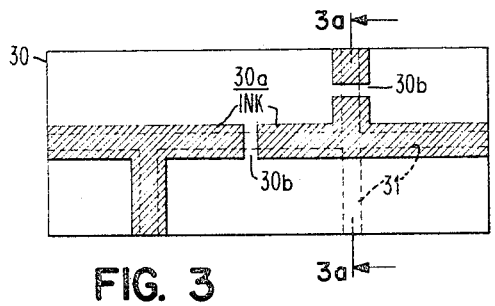
FIG. 3 shows an arrangement for selectively machining discrete portions of a metal film deposited upon a substrate.
Figure 3A:
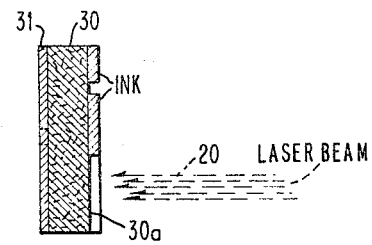
FIGURE 3a is a section view along line 3a—3a of the arrangement of FIGURE 3.

Another embodiment of the invention involves the selective machining of metal films of the kind that are used in printed and deposited circuits. As seen in FIGS. 3 and 3a, a supporting substrate is identified by the reference character 30 on one side of which, as indicated in broken lines, is a configured metal film 31. When it is desired to remove a selected portion of the metal film, ink, having a high degree of energy absorption, is applied preferably through a mask, on the near surface 30a, which is remote from the surface bearing the metal film 31, and on the areas where it is desired to inhibit the machining action of the laser beam. In certain operations it may be more expeditious to apply the laser beam to a substrate upon which a configured mask has been secured rather than applying the ink as described above. Upon exposure of the near surface 30a to the laser beam, the metal film on the remote surface will be removed, only in those regions, for example 30b, where the beam passes through the substrate.

It can be appreciated that different levels of beam energies, as a function of time and intensity, in combination with materials having different absorption characteristics provide a range of machining controls extending from partial removal to total removal of a selected one of said materials.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A process for selectively machining a substrate material of a given energy absorption characteristic and having opposed surfaces comprising:
applying a coating material having a higher energy absorption characteristic than that of said substrate material, to a selected area on the front surface of said substrate; and directing to a corresponding selected area on the back surface of said substrate, a laser beam of such intensity as to cause removal by laser beam action, of said substrate material between the selected areas including said coating material to produce an opening through said substrate.
2. A process as in claim 1 in which said substrate and coating are constituted respectively of a thin sheet of card stock material and a black body material.
3. A process as in claim 1 in which said substrate and coating are constituted respectively of a thin sheet of ceramic and metallic film.
4. A process for selectively machining portions of an adherent metal film supported on a front surface of a substrate comprising:
applying a coating, having a high degree of absorption, only to the back surface areas which are opposite and coincident with those areas bearing film portions not to be machined; and
thereafter directing a laser beam against the back surface, bearing the coated and uncoated areas, to effect machining only on those film portions impinged by the beam passing through the uncoated areas.
5. A process for selectively machining portions of an adherent metal film supported on a front surface of a substrate comprising:
applying against the back surface of the substrate a mask having configured openings which are coincident with those portions of the film to be machined; and
thereafter directing a laser beam against the mask such that machining will be effected only on those film portions impinged by the beam passing through the mask openings and through the substrate onto the metal film on the front surface thereof.

References Cited
UNITED STATES PATENTS

| 3,074,809 | 1/1963 | Owen | 250—65 |
| 3,154,371 | 10/1964 | Johnson | 219—121 |
| 3,183,518 | 5/1965 | Henry et al. | 346—76 |
| 3,256,524 | 6/1966 | Stauffer | 331—94.5 |
| 3,262,122 | 7/1966 | Fleisher et al. | 346—76 |
| 3,266,393 | 8/1966 | Chitayat | 331—94.5 |

RICHARD M. WOOD, *Primary Examiner.*

W. DEXTER BROOKS, *Assistant Examiner.*

U.S. Cl. X.R.

219—69